No. 706,768. Patented Aug. 12, 1902.
B. P. MARCLEY.
SOFT TREAD HORSESHOE.
(Application filed Jan. 23, 1902.)
(No Model.)
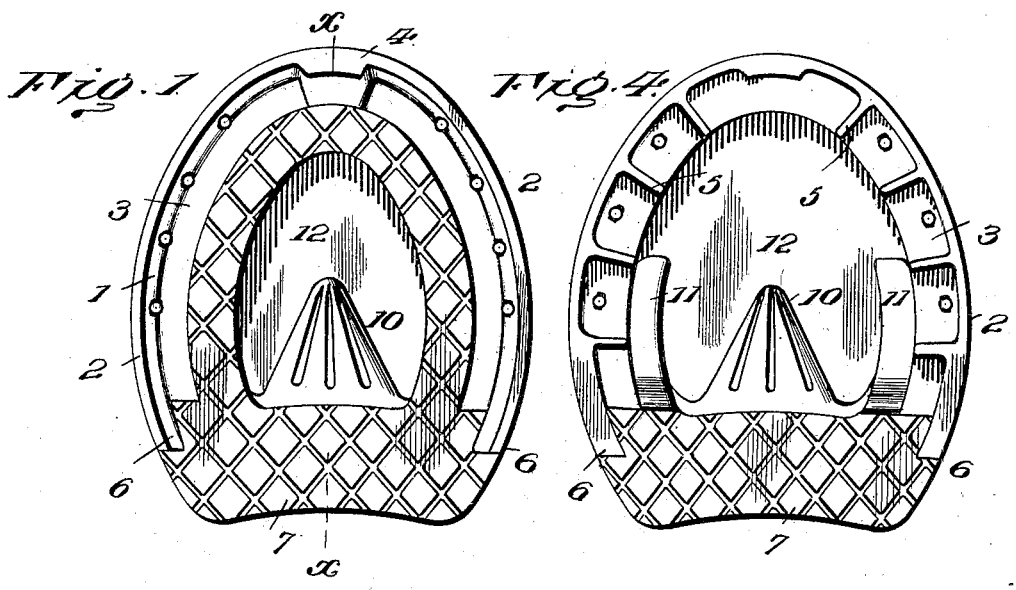
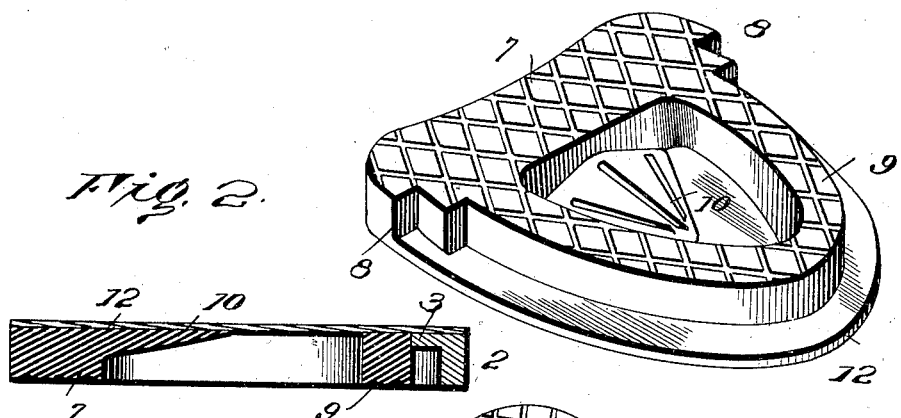
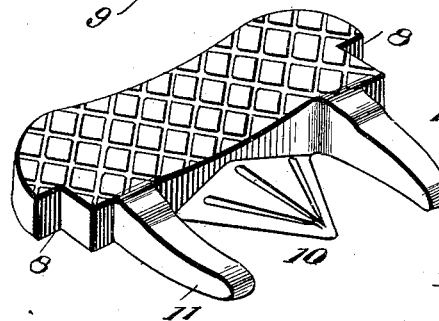
Inventor
B. P. Marcley
Witnesses
Attorneys

UNITED STATES PATENT OFFICE.

BURTON P. MARCLEY, OF BROOKLYN, NEW YORK.

SOFT-TREAD HORSESHOE.

SPECIFICATION forming part of Letters Patent No. 706,768, dated August 12, 1902.

Application filed January 23, 1902. Serial No. 90,973. (No model.)

*To all whom it may concern:*

Be it known that I, BURTON P. MARCLEY, a citizen of the United States, residing at Brooklyn, in the county of Kings and State of New York, have invented certain new and useful Improvements in Soft-Tread Horseshoes; and I do hereby declare the following to be a full, clear, and exact description of the invention, such as will enable others skilled in the art to which it appertains to make and use the same.

This invention has relation to the type of horseshoes provided with a yielding or soft tread to obviate jar and jolt when the animal is driven over asphalt, cobble, and analogous hard pavements. The yielding substance is most generally rubber or a composition of rubber which will regain its normal shape when relieved from compression. One grave objection sought to be overcome is the chipping off of the rubber pad at its outer edges, and particularly at or near the heel, thereby prolonging the life of the shoe and adding materially to its efficiency and value.

With the aforementioned ends in view and such others as appertain to the nature of the invention the improvement consists of the novel features and structural details, which hereinafter will be more fully described and claimed.

In the drawings hereto annexed, Figure 1 is a view of the bottom or tread side of a horseshoe and pad embodying the invention. Fig. 2 is a longitudinal section on the line X X of Fig. 1. Fig. 3 is a perspective view of the pad and base disconnected from the shoe. Fig. 4 is a view, similar to Fig. 1, of a modification. Fig. 5 is a perspective view of the heel-pad shown in Fig. 4.

Corresponding and like parts are referred to in the following description and indicated in all the views of the drawings by the same reference characters.

The horseshoe 1 is of angle formation in transverse section and comprises a vertical rim 2 and a horizontal flange 3. The angular space between the parts 2 and 3 may be uninterrupted except for an inner extension 4 at the toe, or ribs 5 may project therein from the parts 2 and 3, as shown most clearly in Fig. 4. The rim 2 constitutes a continuous calk and the ribs 5 transverse calks to increase the serviceability of the shoe and assist materially in preventing slipping. Heel extensions 6 project rearwardly from the ends of the horseshoe and form prolongations of the rim 2 and are adapted to confine the forward portion of the heel bar or pad 7 and prevent lateral spread thereof, which in practice has been found objectionable in shortening the period of usefulness of the pad by causing the end portions of the part 7 to become rotten and broken by reason of the severe pounding to which the part 7 is subjected when in service. The front corners of the heel bar or pad 7 are cut away, as shown at 8, to receive the rear extension 6. The nail-holes are formed in the flange portion 3 of the shoe and in the form shown in Fig. 4 come between the transverse ribs or calks 5.

In the preferred form of construction the pad forming the soft tread conforms approximately to the outline of the shoe and comprises a heel-bar 7 and a toe portion 9 of a size to fit snugly within the inner edge of the shoe, as shown most clearly in Figs. 1 and 2. This leaves a space between the outer edge of the part 9 and the inner wall of the rim 2. The pad is of a depth corresponding to the height of the rim 2, so as to effectively relieve all jar and jolt incident to traveling over unyielding surfaces. The frog-support 10 is approximately of V form and projects forward toward the toe from the heel portion 7. This support tapers in thickness from heel to toe, so as not to exert injurious pressure against the sole or frog of the foot. The heel portion of the support 10 is set in from the bottom side of the heel pad or bar 7, so as to prevent shock to the foot in the event of the part 10 coming squarely upon a stone or like object. This feature is of material advantage in preventing injury to the animal.

In some instances it is desirable to dispense with the front portion 9 of the pad, and such construction is illustrated in Figs. 4 and 5, and in lieu of the part 9 extensions 11 are provided and taper gradually forward from the tread side of the pad 7. These extensions 11 come inside of the heel portions of the side bars of the horseshoe, as shown most clearly in Fig. 4. In either form of the pad it is provided with a base 12, preferably of leather, vulcanized, cemented, or otherwise attached thereto, and adapted to be clamped between the hoof and the pad and shoe, the nails being driven through the edge portion thereof. This base 12 extends beyond the edges of the pad and is adapted to be trimmed flush with the outer walls of the hoof after the shoe has been placed in position.

Having thus described the invention, what is claimed as new is—

In combination, a horseshoe comprising a continuous vertical rim and an inner horizontal flange and having heel extensions forming continuations of the said rim, and a pad spaced from the rim and having the forward corner portions of the heel part cut away to receive the aforementioned heel extensions of the horseshoe, substantially as set forth.

In testimony whereof I affix my signature in presence of two witnesses.

BURTON P. MARCLEY.

Witnesses:
N. C. STRINGER,
A. P. EGAN.